US012283225B2

(12) United States Patent
Joo et al.

(10) Patent No.: US 12,283,225 B2
(45) Date of Patent: Apr. 22, 2025

(54) DISPLAY APPARATUS AND FLICKER REDUCTION METHOD THEREOF

(71) Applicant: LG Display Co., Ltd., Seoul (KR)

(72) Inventors: Kyu Hwan Joo, Paju-si (KR); Tae Gung Kim, Paju-si (KR); Dae Sung Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/209,189

(22) Filed: Jun. 13, 2023

(65) Prior Publication Data

US 2024/0233615 A1 Jul. 11, 2024

(30) Foreign Application Priority Data

Jan. 6, 2023 (KR) ........................ 10-2023-0002365

(51) Int. Cl.
*G09G 3/32* (2016.01)
*G09G 3/3291* (2016.01)

(52) U.S. Cl.
CPC ............. *G09G 3/32* (2013.01); *G09G 3/3291* (2013.01); *G09G 2310/061* (2013.01);
(Continued)

(58) Field of Classification Search
CPC .. G09G 3/20; G09G 3/32; G09G 3/34; G09G 3/36; G09G 3/3291; G09G 2310/061;
(Continued)

(56) References Cited

U.S. PATENT DOCUMENTS 8,610,697 B2 12/2013 Hasegawa et al.
8,730,221 B2 5/2014 Hasegawa et al.
(Continued)

FOREIGN PATENT DOCUMENTS

CN 111341266 A 6/2020
CN 114387939 A 4/2022
(Continued)

OTHER PUBLICATIONS

Intellectual Property Office of the United Kingdom, Combined Search and Examination Report, United Kingdom Patent Application No. GB2313174.1, Feb. 16, 2024, five pages.
(Continued)

*Primary Examiner* — Michael A Faragalla
(74) *Attorney, Agent, or Firm* — Fenwick & West LLP

(57) ABSTRACT

A display apparatus comprises: a display panel including pixels that emit light, wherein an amount of emitted light is controlled based on a data voltage, and an emission time of the pixels is controlled based on a duty ratio of an emission control signal applied to the pixels; a timing controller configured to control the emission control signal in an active period of one frame and in a blank period of the one frame, where the data voltage is supplied to the pixels during the active period of the one frame and the data voltage is maintained during the blank period of the one frame; and a gate driver configured to apply to the pixels the emission control signal having a first duty ratio during the active period and the emission control signal having a second duty ratio that is different from the first duty ratio during the blank period.

18 Claims, 15 Drawing Sheets

(52) U.S. Cl.
CPC . *G09G 2310/08* (2013.01); *G09G 2320/0233* (2013.01); *G09G 2320/0247* (2013.01)

(58) Field of Classification Search
CPC ....... G09G 2310/08; G09G 2320/0233; G09G 2320/0247
See application file for complete search history.

(56) References Cited

U.S. PATENT DOCUMENTS

| | | | |
|---|---|---|---|
| 8,941,633 B2 | 1/2015 | Hasegawa et al. | |
| 9,378,679 B2 | 6/2016 | Hasegawa et al. | |
| 9,640,115 B2 | 5/2017 | Hasegawa et al. | |
| 10,186,201 B2 | 1/2019 | Hasegawa et al. | |
| 10,380,948 B2 | 8/2019 | Hasegawa et al. | |
| 10,515,593 B2 | 12/2019 | Hasegawa et al. | |
| 10,638,086 B2 | 4/2020 | Ahn et al. | |
| 11,030,962 B2 | 6/2021 | Lee et al. | |
| 11,037,506 B2 | 6/2021 | Noh et al. | |
| 11,172,161 B2 | 11/2021 | Ahn et al. | |
| 11,508,317 B2 | 11/2022 | Ha et al. | |
| 11,532,280 B2 | 12/2022 | Noh et al. | |
| 11,574,591 B2 | 2/2023 | Lee et al. | |
| 11,676,535 B2 | 6/2023 | Jeon et al. | |
| 2010/0085341 A1 | 4/2010 | Hasegawa et al. | |
| 2014/0055509 A1 | 2/2014 | Hasegawa et al. | |
| 2014/0218419 A1 | 8/2014 | Hasegawa et al. | |
| 2014/0333605 A1 | 11/2014 | Hasegawa et al. | |
| 2016/0307514 A1 | 10/2016 | Hasegawa et al. | |
| 2017/0229068 A1 | 8/2017 | Hasegawa et al. | |
| 2018/0103231 A1 | 4/2018 | Ahn et al. | |
| 2018/0151132 A1 | 5/2018 | Lee et al. | |
| 2019/0122615 A1 | 4/2019 | Hasegawa et al. | |
| 2019/0347995 A1 | 11/2019 | Hasegawa et al. | |
| 2020/0082768 A1 | 3/2020 | Oh et al. | |
| 2020/0090596 A1 | 3/2020 | Oh et al. | |
| 2020/0135146 A1 | 4/2020 | Lee et al. | |
| 2020/0193915 A1 | 6/2020 | Noh et al. | |
| 2020/0211481 A1 | 7/2020 | Lee et al. | |
| 2020/0244920 A1 | 7/2020 | Ahn et al. | |
| 2021/0304681 A1 | 9/2021 | Noh et al. | |
| 2022/0068221 A1* | 3/2022 | Ha | G09G 3/3291 |
| 2022/0108656 A1 | 4/2022 | Lee et al. | |
| 2022/0415254 A1 | 12/2022 | Jeon et al. | |
| 2023/0117873 A1* | 4/2023 | Kim | G09G 3/32 345/55 |
| 2023/0419915 A1* | 12/2023 | Huang | G09G 3/3648 |

FOREIGN PATENT DOCUMENTS

| | | |
|---|---|---|
| JP | 2010-085874 A | 4/2010 |
| JP | 2018-060199 A | 4/2018 |
| KR | 10-2018-0058279 A | 6/2018 |
| KR | 10-2018-0078909 A | 7/2018 |
| KR | 10-2020-0075945 A | 6/2020 |
| KR | 10-2020-0079794 A | 7/2020 |
| KR | 10-2023-0001027 A | 1/2023 |

OTHER PUBLICATIONS

Taiwan Intellectual Property Office, Office Action, Taiwanese Patent Application No. 112128244, Aug. 7, 2024, 10 pages.
The Japan Patent Office, Office Action, Japanese Patent Application No. 2023-130639, May 7, 2024, 12 pages.

* cited by examiner

| FRAME FREQUENCY | EM DUTY ON/OFF RATIO FIXED-LUMINANCE | EM DUTY ON/OFF RATIO VARIATION-LUMINANCE |
|---|---|---|
| 144 | 209.6 | 217 |
| 120 | 212 | 217.2 |
| 100 | 213.4 | 217.3 |
| 80 | 214.6 | 217.5 |
| 60 | 215.7 | 217.7 |
| 40 | 217 | 217.9 |

DISPLAY APPARATUS AND FLICKER REDUCTION METHOD THEREOF

CROSS-REFERENCE TO RELATED APPLICATION

This application claims the benefit of the Republic of Korea Patent Application No. 10-2023-0002365 filed on Jan. 6, 2023, which is hereby incorporated by reference in its entirety

BACKGROUND

Field of Technology

The present disclosure relates to a display apparatus and a flicker reduction method thereof.

Discussion of the Related Art

Display apparatuses may be manufactured based on a micro light emitting diode (LED), so as to implement low power consumption. Micro-LED chips included in display apparatuses may each include a micro-LED which is manufactured without a wafer and has a size of about 100 μm or less.

Micro-LEDs have low light efficiency with respect to a low current, and due to this, are high in driving current. However, when micro-LEDs are continuously driven with a high current, power consumption increases, and thus, power consumption is decreased through emission (EM) duty driving for adjusting an emission time at a certain duty in one frame. However, display apparatuses including micro-LEDs have a flicker issue caused by a luminance deviation in varying a frame frequency.

SUMMARY

To overcome the aforementioned problem of the related art, the present disclosure may provide a display apparatus and a flicker reduction method thereof, which improve a luminance deviation caused by a frame frequency to reduce flicker.

In one embodiment, a display apparatus comprises: a display panel including a plurality of pixels that emit light, wherein an amount of emitted light is controlled based on a data voltage, and an emission time of the plurality of pixels is controlled based on a duty ratio of an emission control signal applied to the plurality of pixels; a timing controller configured to control the emission control signal in an active period of one frame and in a blank period of the one frame, where the data voltage is supplied to the plurality of pixels during the active period of the one frame and the data voltage is maintained during the blank period of the one frame; and a gate driver configured to apply to the plurality of pixels the emission control signal having a first duty ratio during the active period and the emission control signal having a second duty ratio that is different from the first duty ratio during the blank period.

In one embodiment, a method of driving a display apparatus including a plurality of pixels that emit light where an amount of emitted light is controlled based on a data voltage, and an emission time of the plurality of pixels is controlled based on a duty ratio of an emission control signal applied to the plurality of pixels, the method comprising: controlling the duty ratio of the emission control signal in an active period of one frame and in a blank period of the one frame, where the data voltage is supplied to the plurality of pixels during the active period of the one frame and the data voltage is maintained during the blank period of the one frame; and applying to the plurality of pixels the emission control signal having a first duty ratio during the active period and the emission control signal having a second duty ratio that is different from the first duty ratio during the blank period.

In one embodiment, a display device comprises: a display panel including a plurality of pixels that emit light, wherein an amount of emitted light is based on a data voltage, and an emission time of the plurality of pixels is controlled by a duty ratio of an emission control signal applied to the plurality of pixels; a timing controller configured to switch driving of the plurality of pixels between a first frame frequency and a second frame frequency that is different from the first frame frequency; and a gate driver configured to apply to the plurality of pixels the emission control signal having a first duty ratio during an active period of one frame during which data voltages are supplied to the plurality of pixels, and apply the emission control signal having a second duty ratio that is different from the first duty ratio during a blank period of the one frame during which the data voltages are maintained, wherein the emission control signal has the first duty ratio during an active period of a first frame having the first frame frequency and during an active period of a second frame having the second frame frequency, and the emission control signal has the second duty ratio during a blank period of the first frame having the first frame frequency and during a blank period of the second frame having the second frame frequency.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
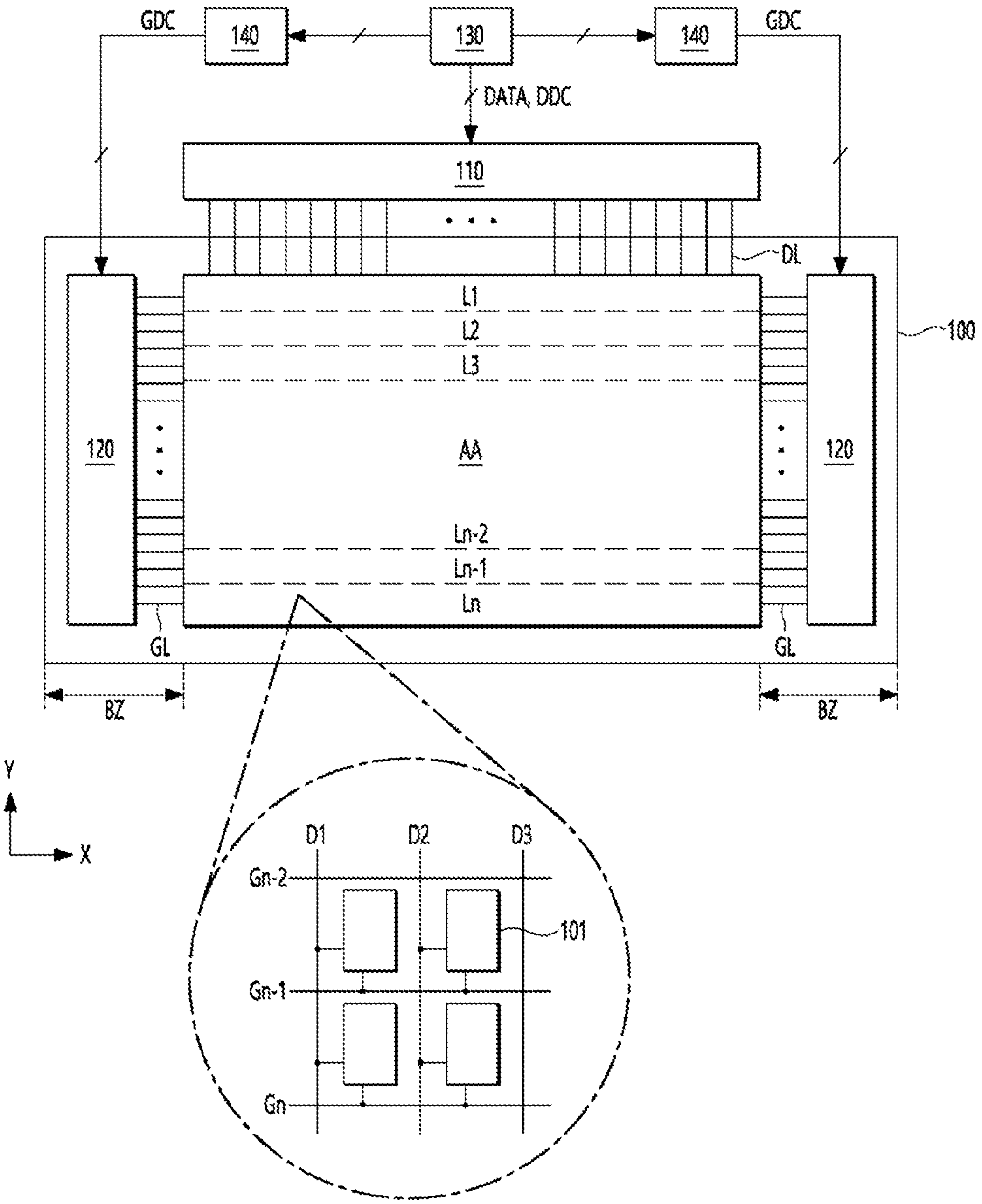
FIG. 1 is a block diagram illustrating a display apparatus according to an embodiment of the present disclosure according to an embodiment of the present disclosure.

Hereinafter, the present disclosure will be described more fully with reference to the accompanying drawings, in which exemplary embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

The shapes, sizes, ratios, angles, numbers and the like disclosed in the drawings for description of various embodiments of the present disclosure to describe embodiments of the present disclosure are merely exemplary and the present disclosure is not limited thereto. Like reference numerals refer to like elements throughout. Throughout this specification, the same elements are denoted by the same reference numerals. As used herein, the terms "comprise", "having," "including" and the like suggest that other parts can be added unless the term "only" is used. As used herein, the singular forms "a", "an", and "the" are intended to include the plural forms as well, unless context clearly indicates otherwise.

Elements in various embodiments of the present disclosure are to be interpreted as including margins of error even without explicit statements.

In describing a position relationship, for example, when a position relation between two parts is described as "on~", "over~", "under~", and "next~", one or more other parts may be disposed between the two parts unless "just" or "direct" is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In the following description, when the detailed description of the relevant known function or configuration is determined to unnecessarily obscure the important point of the present disclosure, the detailed description will be omitted. Hereinafter, embodiments of the present disclosure will be described in detail with reference to the accompanying drawings.

Figure 2:
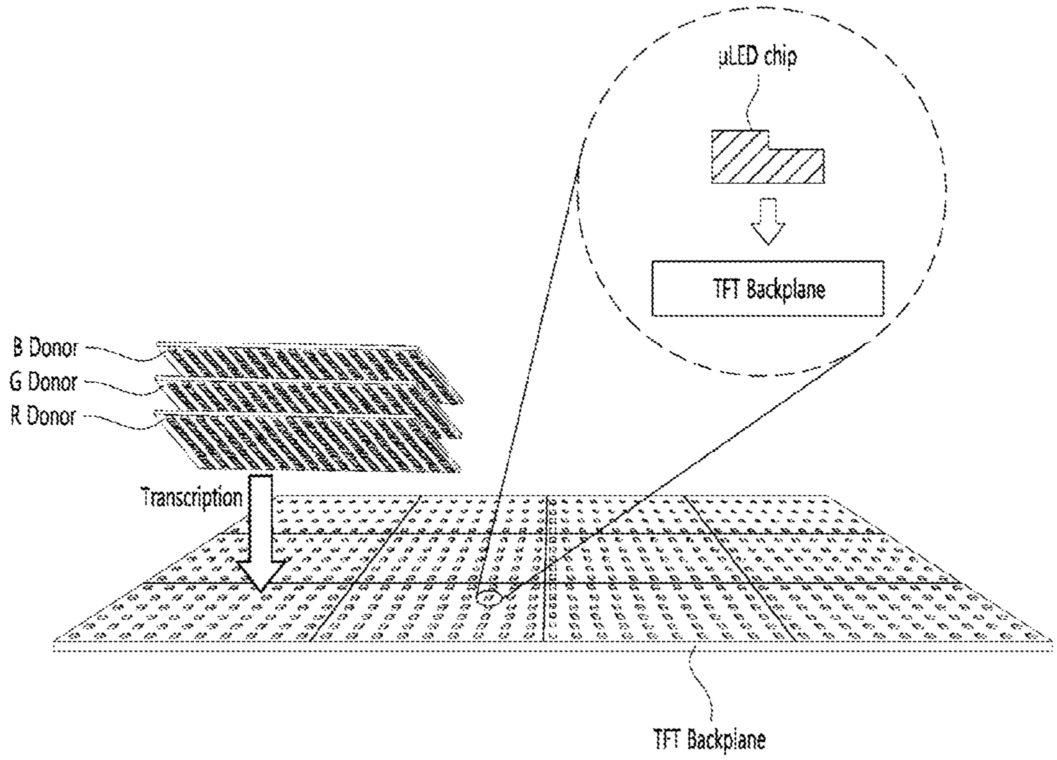
FIGS. 2 and 3 are diagrams illustrating a display panel based on a micro light emitting diode (LED) according to an embodiment of the present disclosure.
Figure 3:
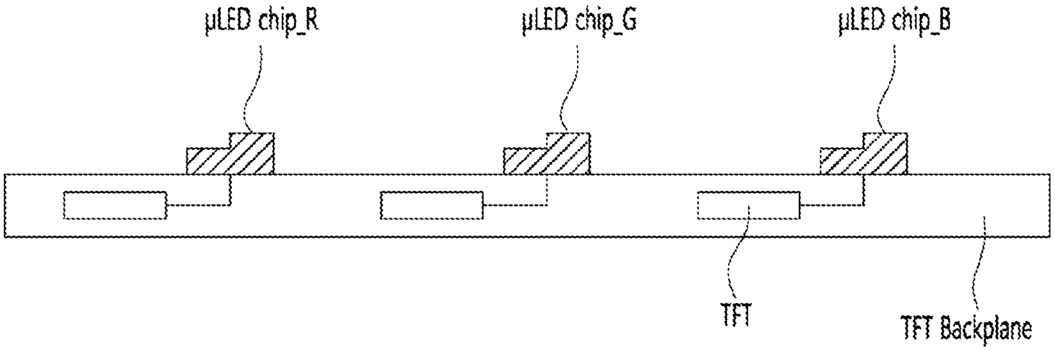

FIG. 1 is a block diagram illustrating a display apparatus according to an embodiment of the present disclosure. FIGS. 2 and 3 are diagrams illustrating a display panel based on a micro light emitting diode (LED) according to an embodiment of the present disclosure.

Referring to FIG. 1, a display panel 100 may include a screen AA which reproduces an input image. The screen AA may include a pixel array which displays pixel data (hereinafter referred to as "image data") of an input image. The pixel array may include a plurality of data lines DL, a plurality of gate lines GL intersecting with the data lines DL, and a plurality of pixels 101.

The pixels 101 may be arranged on the screen AA in a matrix type defined by the data lines DL and the gate lines GL. The pixel 101 may be arranged as various types, such as a type which shares pixels emitting lights having the same color, a stripe type, and a diamond type as well as a matrix type, on the screen AA.

The pixel array may include a plurality of pixel columns and a plurality of pixel lines L1 to Ln intersecting with the pixel columns. Each of the pixel columns may include pixels which are arranged in a Y-axis direction. A pixel line may include pixels which are arranged in an X-axis direction. One vertical period may be one frame period needed for writing image data DATA of one frame in all pixels of the screen. One horizontal period may be a time obtained by dividing one frame period by the number of pixel lines L1 to Ln. One horizontal period may be a time needed for writing the image data DATA of one pixel line, sharing a gate line GL, in pixels of one pixel line.

One frame period may include an active period where data voltages corresponding to the image data DATA are supplied to the pixels 101 and a blank period that is non-overlapping with the active period. In the blank period, data voltages may not be supplied to the pixels 101.

The pixels 101 may include a red (R) pixel, a green (G) pixel, and a blue (B) pixel for implementing colors.

Figure 4:
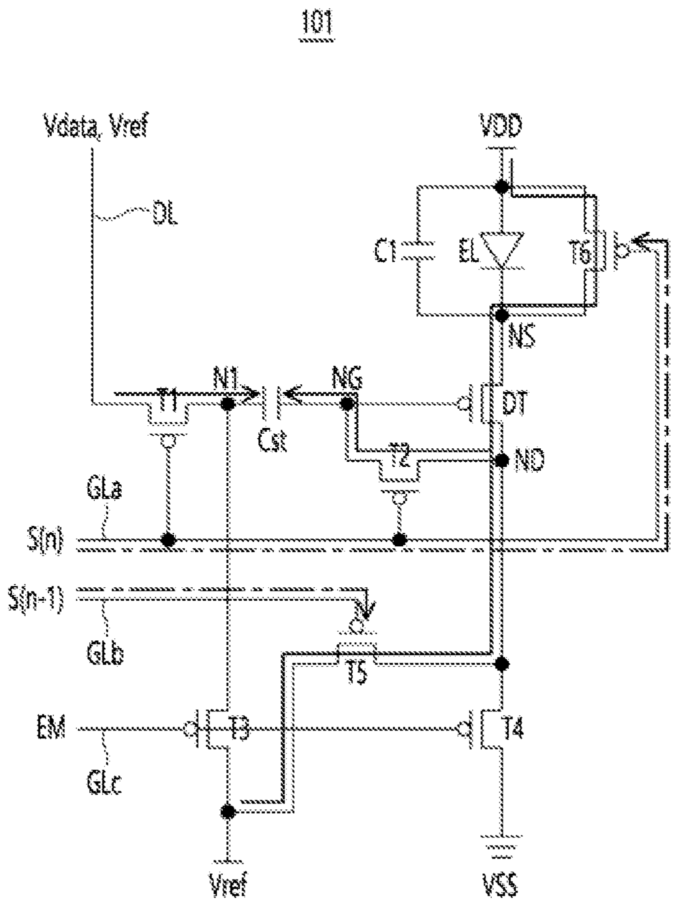
FIG. 4 is an equivalent circuit diagram of each pixel included in a display panel according to an embodiment of the present disclosure.

Each of the pixels 101, as in FIGS. 2 and 3, may include a micro-LED chip (μLED chip) as a light emitting device EL (see FIG. 4). A plurality of micro-LED chips (μLED chip) may include red chips (μLED chip_R), green chips (μLED chip_G), and blue chips (μLED chip_B), which are disposed on a thin film transistor (TFT) backplane. A red (R) pixel may include a red chip (μLED chip_R) as a light emitting device EL, a green (G) pixel may include a green chip (μLED chip_G) as a light emitting device EL, and a blue (B) pixel may include a blue chip (μLED chip_B) as a light emitting device EL.

The micro-LED chips (μLED chip) may be transferred from R/G/B donors, and thus, may be mounted on a TFT backplane. The red chips (μLED chip_R) may be transferred from an R donor, the green chips (μLED chip_G) may be transferred from a G donor, and the blue chips (μLED chip_B) may be transferred from a B donor. Transfer technology may use an electrostatic force, a laser, a speed-dependent tacky force, and a load-dependent tacky force.

The transfer technology is not limited thereto and may use self-assembly based on an electrostatic force.

The TFT backplane may be implemented in an active matrix structure for efficient driving. In the TFT backplane, the pixels 101 may be defined by intersections of the data lines DL, the gate lines GL, and the power lines.

The plurality of pixels 101 may configure one unit pixel. For example, R, G, and B pixels arranged adjacent thereto may configure one unit pixel in an extension direction of the gate line GL or an extension direction of the data line DL.

In FIG. 1, "D1 to D3" illustrated in a magnified view of the display panel 100 as indicated by a circle may be data lines, and "Gn−2 to Gn" may be gate lines. Each of the pixels 101 of FIG. 1 may include the same pixel circuit. The pixel circuit may be implemented with a driving element, one or more switch elements, and one or more capacitors.

Touch sensors may be disposed on the display panel 100. The touch sensors may be implemented as on-cell or add-on type touch sensors which are arranged on the screen AA of the display panel 100, or may be implemented as in-cell type touch sensors embedded in the pixel array. A touch input may be sensed through the touch sensors, or may be sensed through only pixels even without touch sensors.

A display panel driver may include a source driver 110 and a gate driver 120. The display panel driver may write the image data DATA in the pixels 101 of the display panel 100, based on control by a timing controller 130.

The source driver 110 may convert the image data DATA, received from the timing controller 130, into gamma compensation voltages by using a digital-to-analog converter (DAC) to generate data voltages. The source driver 110 may supply the data voltages to the data lines DL. The data voltages may be supplied to the data lines DL and may be applied to the driving elements through the switch elements of the pixels 101. The source driver 110 may be implemented with one or more source driving integrated circuits (ICs). The source driving IC may further include a touch driver which generates a touch sensor driving signal and converts a charge variation of a touch sensor into touch raw data.

A gate driver 120 may be provided in a bezel region BZ which is outside of the active area AA and does not display an image on the display panel 100. The gate driver 120 may sequentially supply a gate signal, synchronized with data voltages, to the gate lines GL according to control by the timing controller 130. The gate signal may simultaneously activate pixel lines into which the data voltages are charged. The gate driver 120 may output the gate signal by using one or more shift registers and may shift the gate signal. The gate signal output by the gate driver 120 may include one or more scan signals SCAN and an emission control signal EM as further described below.

The timing controller 130 may receive the image data DATA and a timing signal, synchronized with the image data DATA, from a host system (not shown). The timing signal may include a vertical synchronization signal Vsync, a horizontal synchronization signal Hsync, a clock signal DCLK, and a data enable signal DE. The vertical synchronization signal Vsync may define a vertical period (i.e., one frame period). The horizontal synchronization signal Hsync may define a horizontal period. The data enable signal DE may define a time for which the image data DATA is transferred in the vertical period or the horizontal period. The vertical period and the horizontal period may be previously known by a method of counting the data enable signal DE, and thus, the vertical synchronization signal Vsync and the horizontal synchronization signal Hsync may be omitted.

An active period and a blank period of one vertical period may be further defined by the data enable signal DE. In the active period, the data enable signal DE may swing between a logic high voltage and a logic low voltage. In the blank period, the data enable signal DE may continuously maintain a logic low voltage.

The timing controller 130 may generate a source timing control signal DDC for controlling an operation timing of the source driver (or data driver) 110 and a gate timing control signal GDC for controlling an operation timing of the gate driver 120, based on the timing signal Vsync, Hsync, and DE received from the host system.

The timing controller 130 may multiply an input frame frequency by I (where i is a natural number) to control an operation timing of each of a display panel driver 110 and 120 with "input frame frequency×frame frequency of i Hz". The input frame frequency may be about 60 Hz in national television standards committee (NTSC) and may be about 50 Hz in phase-alternating line (PAL).

The timing controller 130 may drive the pixels 101 at various refresh rates. The timing controller 130 may drive the pixels 101 in a variable refresh rate (VRR) mode, namely, so as to switch between a plurality of refresh rates. The refresh rate may be referred to as a frame frequency.

In the VRR mode, the timing controller 130 may vary a length of a blank period on the basis of a frame frequency with a length of an active period being fixed. For example, the timing controller 130 may control the blank period to a first length in a first frame frequency and may control the blank period to a second length, which is longer than the first length, in a second frame frequency which is less than the first frame frequency.

The host system be one of a television (TV), a set-top box, a navigation system, a personal computer (PC), a home theater, an automotive display system, a mobile device, and a wearable device. In the mobile device and the wearable device, the source driver 110, the timing controller 130, and a level shifter 140 may be integrated into one driving IC.

The level shifter 140 may convert a voltage of the gate timing control signal GDC, output from the timing controller 130, into a gate on voltage or a gate off voltage and may supply the gate on voltage or the gate off voltage to the gate driver 120. A logic off voltage of the gate timing control signal GDC may be converted into the gate off voltage, and a logic on voltage of the gate timing control signal GDC may be converted into the gate on voltage.

The timing controller 130 may transfer the image data DATA to the source driver 110 through an internal interface circuit. The internal interface circuit may be implemented as an embedded clock point to point interface (EPI), but is not limited thereto.

FIG. 4 is an equivalent circuit diagram of the pixel 101 included in the display panel 100 of FIG. 1 according to one embodiment.

Referring to FIG. 4, the pixel 101 may include a light emitting device EL, a driving element DT, and a node circuit.

The node circuit may be an internal compensation circuit which is connected with a data line DL, first to third gate lines gLa, GLb, and GLc, and a plurality of power lines. The node circuit may sample a threshold voltage of the driving element DT to reflect a gate-source voltage of the driving element DT, and thus, may compensate for a driving current flowing in the driving element DT so as not to be affected by the degree of shift of threshold voltage of the driving element DT. The node circuit may include first to sixth switch elements T1 to T6, a first capacitor C1, and a storage capacitor Cst.

The driving element DT and the first to sixth switch elements T1 to T6 may each be implemented as a thin film transistor (TFT). All or some of transistors DT and T1 to T6 may each be a P-type TFT or an N-type TFT. Also, the N-type TFT may be an oxide TFT, and the P-type TFT may be a polycrystalline silicon TFT.

The driving element DT may be a driving element which generates the driving current, based on the gate-source voltage thereof. A gate electrode of the driving element DT may be connected with a gate node NG, a source electrode of the driving element DT may be connected with a source node NS, and a drain electrode of the driving element DT may be connected with a drain node ND.

The light emitting device EL may emit light having intensity corresponding to the driving current input from the driving element DT. The light emitting device EL may be implemented as a micro-LED including an inorganic emission layer, but is not limited thereto. The light emitting device EL may be implemented as an organic light emitting diode (OLED) including an organic emission layer in another embodiment. An anode electrode of the light emitting device EL may be connected with an input terminal of a high level driving voltage VDD, and a cathode electrode of the light emitting device EL may be connected with the source node NS.

The first switch element T1 may connect the data line DL with a first node N1, based on a first scan signal S(n). The first switch element T1 may include a gate electrode connected with the first gate line gLa, a source electrode connected with the data line DL, and a drain electrode connected with the first node N1.

The second switch element T2 may connect the gate node NG with the drain node ND, based on the first scan signal S(n). The second switch element T2 may include a gate electrode connected with the first gate line gLa, a source electrode connected with the drain node ND, and a drain electrode connected with the gate node NG.

The third switch element T3 may connect the first node N1 with an input terminal of a reference voltage Vref, based on an emission control signal EM. The third switch element T3 may include a gate electrode connected with the third gate line GLc, a source electrode connected with the first node N1, and a drain electrode connected with the input terminal of the reference voltage Vref.

The fourth switch element T4 may connect the drain node ND with an input terminal of a low level driving voltage VSS (e.g., a second driving voltage) that is less than the high level driving voltage VDD, based on the emission control signal EM. The fourth switch element T4 may include a gate electrode connected with the third gate line GLc, a source electrode connected with the drain node ND, and a drain electrode to which the low level driving voltage VSS is input.

The fifth switch element T5 may connect the drain node ND with the input terminal of the reference voltage Vref, based on the second scan signal S(n−1). The fifth switch element T5 may include a gate electrode connected with the second gate line GLb, a source electrode connected with the drain node ND, and a drain electrode to which the reference voltage Vref is input.

The sixth switch element T6 may connect the source node NS with an input terminal of the high level driving voltage VDD, based on the first scan signal S(n). That is, the sixth switch element T6 may short-circuit the anode electrode and the cathode electrode of the light emitting device EL, based on the first scan signal S(n). The sixth switch element T6 may include a gate electrode connected with the first gate line gLa, a source electrode connected with the anode electrode, and a drain electrode connected with the cathode electrode.

The first capacitor C1 may be connected with the anode electrode and the cathode electrode of the light emitting device EL. Also, the storage capacitor Cst may be connected with the first node N1 and the gate node NG. The storage capacitor Cst, the light emitting device EL, and the sixth switch element T6 are connected in parallel as shown in FIG. 4.

Figure 5:
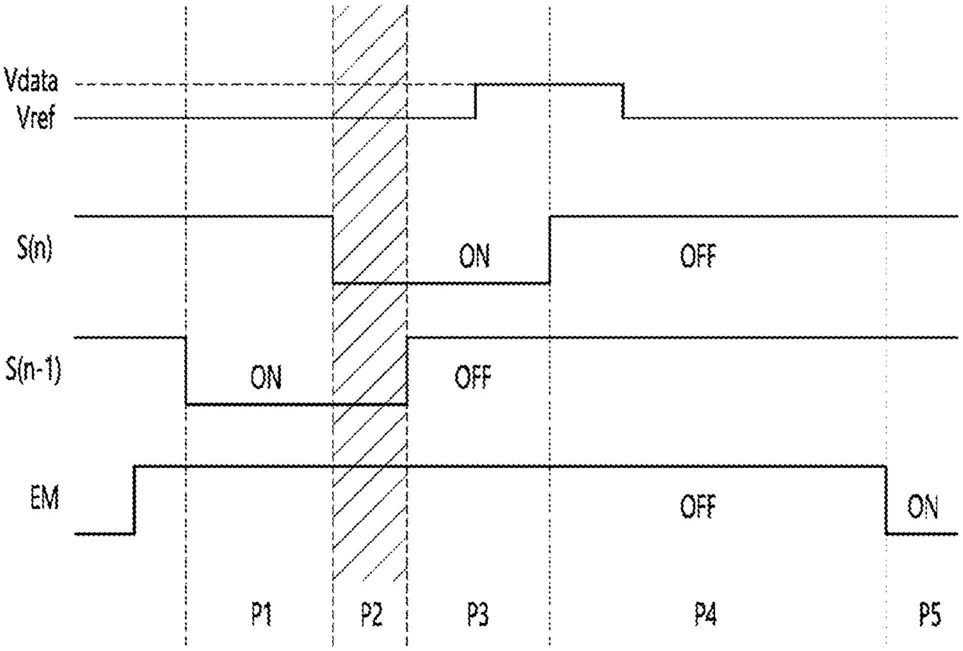
FIG. 5 is a driving waveform diagram of the pixel illustrated in FIG. 4 according to an embodiment of the present disclosure.

FIG. 5 is a driving waveform diagram of the pixel 101 illustrated in FIG. 4 according to one embodiment. Referring to FIG. 5, a first frame for driving pixels 101 may include an active period and a blank period. The active period may include an initialization period P1, a threshold voltage sampling period P2, a data programming period P3, a holding period P4, and a portion of an emission period P5. The blank period may include the remaining portion of the emission period P5.

In the initialization period P1, the fifth switch element T5 may be turned on, and thus, the drain node ND may be initialized to the reference voltage Vref.

In the threshold voltage sampling period P2, the driving element DT and the fifth and sixth switch elements T5 and T6 may be turned on, and thus, the input terminal of the high level driving voltage VDD may be connected with the input terminal of the reference voltage Vref. In the threshold voltage sampling period P2, the second switch element T2 may be turned on, and thus, the gate node NG and the drain node ND may be short-circuited, whereby a threshold voltage of the driving element DT may be sampled (VDD+Vth) and stored in the gate node NG.

In the data programming period P3, the first switch element T1 may be turned on, and thus, a voltage of the first node N1 may be changed from the reference voltage Vref to a data voltage Vdata. Also, a voltage of the gate node NG may vary by a changed voltage "Vdata−Vref". A voltage of the gate node NG may be "VDD+Vth−(Vdata−Vref)". In the data programming period P3, the sixth switch element T6 may be turned on, and thus, a voltage of the source node NS may be the high level driving voltage VDD.

In the holding period P4, all of the switch elements T1 to T6 may be turned off, and thus, a voltage of the gate node NG and a voltage of the source node NS may be maintained to be equal to the data programming period P3.

In the emission period P5, the fourth switch element T4 may be turned on by the emission control signal EM, and thus, the driving current may flow in the driving element DT. A level of the driving current may be irrelevant to a threshold voltage Vth and may be proportional to the square of "Vdata−Vref". The light emitting device EL may emit light with the driving current.

The emission control signal EM may be applied at an off level in the initialization period P1, the threshold voltage sampling period P2, the data programming period P3, and the holding period P4 and may be applied at an on level in the emission period P5.

The amount of light emitted from the light emitting device EL may be proportional to a level of the driving current, and thus, the amount of light emitted from the pixel 101 may be defined as being controlled based on a data voltage Vdata.

Also, an emission time of the pixel 101 may be defined as being controlled based on an on duty ratio of the emission control signal EM.

In “P2” of FIG. 5 included in an active period ACT, the reference voltage Vref may be increased and maintained to be higher than a default level due to the short circuit of the high level driving voltage VDD (e.g., a first driving voltage) and the reference voltage Vref, and then, may be recovered to the default level in the blank period BLK. A level of the driving current for determining the amount of light emitted from the light emitting device EL may be proportional to the square of “Vdata−Vref”, and thus, in each frame, an average luminance of the active period ACT may be lower than an average luminance of the blank period BLK.

In other words, in the active period ACT, the reference voltage Vref may increase more than the default level due to a collision between the high level driving voltage VDD and the reference voltage Vref in the middle of data addressing (for example, “P2” of FIG. 5). In the blank period BLK, the reference voltage Vref may be recovered to the default level. Accordingly, the average luminance of the active period ACT may be lower than the average luminance of the blank period BLK.

In the VRR mode, a length of the active period ACT may be fixed and a length of the blank period BLK may vary based on a frame frequency. As a length of the blank period BLK increases in one frame (i.e., as the frame frequency is lowered), a luminance deviation between the active period ACT and the blank period BLK may increase. As a result, when the frame frequency is changed in the VRR mode, flicker caused by the luminance deviation between the active period ACT and the blank period BLK may be recognized.

Figure 6:
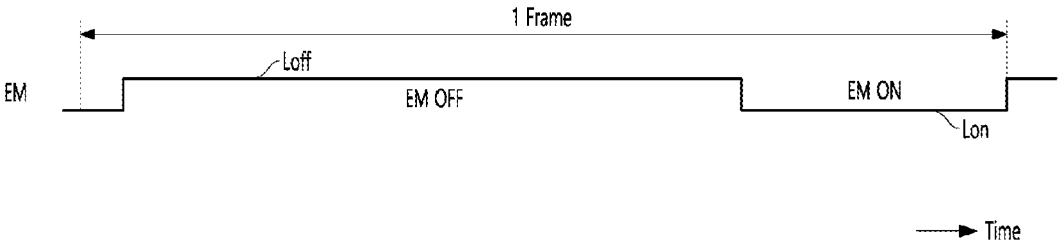
FIG. 6 is a driving waveform diagram of an emission control signal based on a single toggle, according to a comparative example.
Figure 7A:
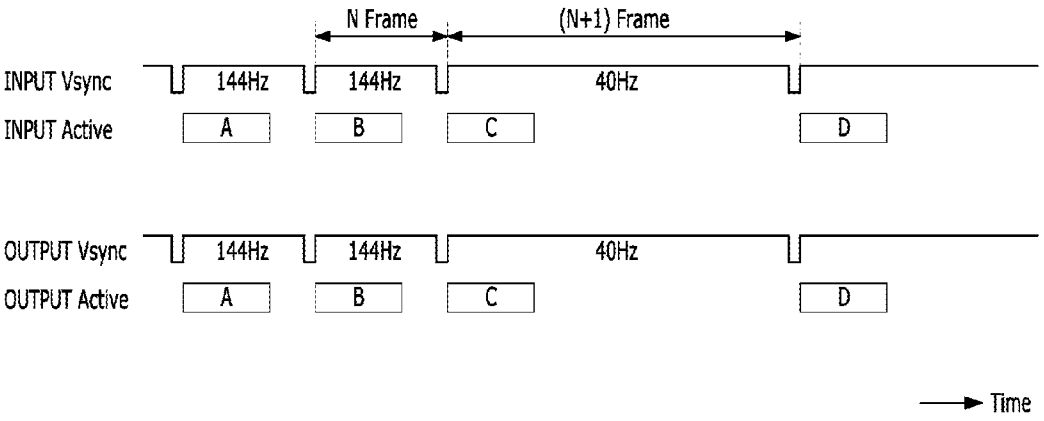
FIGS. 7A and 7B are diagrams for describing the reason that EM duty driving based on a single toggle is incapable of being applied to a variable refresh rate (VRR)
Figure 7B:
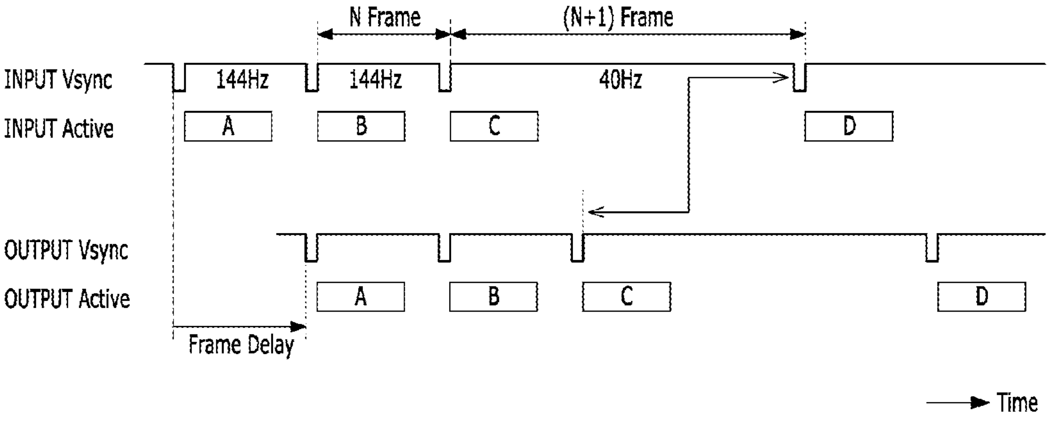

FIG. 6 is a driving waveform diagram of an emission control signal based on a single toggle, according to a comparative example. FIGS. 7A and 7B are diagrams for describing the reason that EM duty driving based on a single toggle is incapable of being applied to a VRR.

Referring to FIG. 6, an emission control signal EM may be toggled from an off level Loff to an on level Lon once during one frame period. In this case, an on duty of the emission control signal EM may be defined as a ratio, occupied by the on level Lon, of one frame period.

Such EM duty driving based on a single toggle may not be applied to the VRR mode because a length of a corresponding frame is not known at a start time of each frame.

As the frame frequency is changed in the VRR mode, one frame period may vary. However, in the VRR mode, a length of a variable frame may be checked at only an end time of a corresponding frame and may not previously be checked at a start time of a corresponding frame. Because a case is assumed where one frame period is not fixed, EM duty driving based on a single toggle may be difficult to be applied to the VRR mode where one frame period varies.

In detail, EM duty driving based on a single toggle may not be applied to a VRR mode of a one-frame delay type shown in FIG. 7B as well as a VRR mode of a bypass type shown in FIG. 7A.

In the VRR mode of the bypass type, an input vertical synchronization signal Vsync and an output vertical synchronization signal Vsync1 may be synchronized with each other without delay. Also, an input active period and an output active period of each frame may be synchronized with each other without delay. In the VRR mode of the bypass type, for example, one frame period may be changed based on a frame frequency which varies between about 40 Hz and about 144 Hz, and a length of a variable frame may not previously be checked at a start time of each frame, whereby an EM duty based on a single toggle may not be applied.

In the VRR mode of a one-frame delay type, the output vertical synchronization signal Vsync may be delayed by one frame with respect to the input vertical synchronization signal Vsync, based on the use of a frame memory. Also, in each frame, an output active period may be delayed by one frame with respect to an input active period. In the VRR mode of the one-frame delay type, one frame period may be changed based on a frame frequency which varies between about 40 Hz and about 144 Hz, and a length of an N+1th frame may not previously be checked at a start time of some frames (for example, the N+1th frame), whereby an EM duty based on a single toggle may not be applied.

Figure 8:
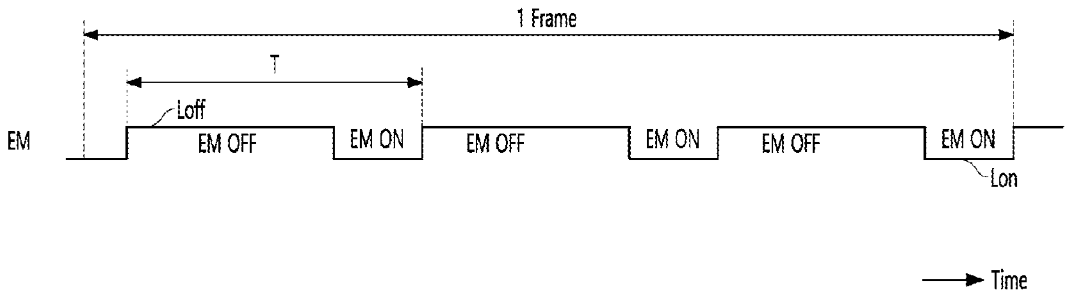
FIG. 8 is a driving waveform diagram of a multi-toggled emission control signal according to an embodiment.

FIG. 8 is a driving waveform diagram of a multi-toggled emission control signal according to an embodiment.

Referring to FIG. 8, an emission control signal EM output by the gate driver 120 may have a multi-pulse form which is toggled from an off level Loff to an on level Lon and from the on level Lon to the off level Loff a plurality of times during one frame period. The emission control signal EM having the multi-pulse form may include on periods and off periods, which are each divided in plurality. A unit pulse period T of the emission control signal EM may include one off period and one on period continuous thereto. An on duty ratio of the emission control signal EM may be defined as a ratio, occupied by an on period for the pixels to emit light of the unit pulse period T and an off period for the pixels not to emit light. An off duty ratio of the emission control signal EM may be defined as a ratio, occupied by an off period for the pixels not to emit light and an on period for the pixels to emit light, of the unit pulse period T. The emission control signal EM may comprise of a set of unit pulses, and thus, a ratio, occupied by a total sum of on periods, of one frame period may be the same as an on duty ratio based on the unit pulse period T and a ratio, occupied by a total sum of off periods, of one frame period may be the same as an off duty ratio based on the unit pulse period T.

Because EM duty driving based on a multi-toggle uses the emission control signal EM having a multi-pulse form, it may not be needed to previously know a length of a corresponding frame at a start time of each frame. EM duty driving based on a multi-toggle may correspond to the number of unit pulse periods T including the emission control signal EM in real time, based on one frame period which varies in the VRR mode, and thus, an on duty ratio of the emission control signal EM may be set to be constant in all variable frames. As described above, EM duty driving based on a multi-toggle may be easily applied to the VRR mode.

FIGS. 9 to 12 are diagrams showing a comparative example where an on duty ratio of a multi-toggled emission control signal EM is fixed to be constant regardless of an active period ACT and a blank period BLK.

Figure 9:
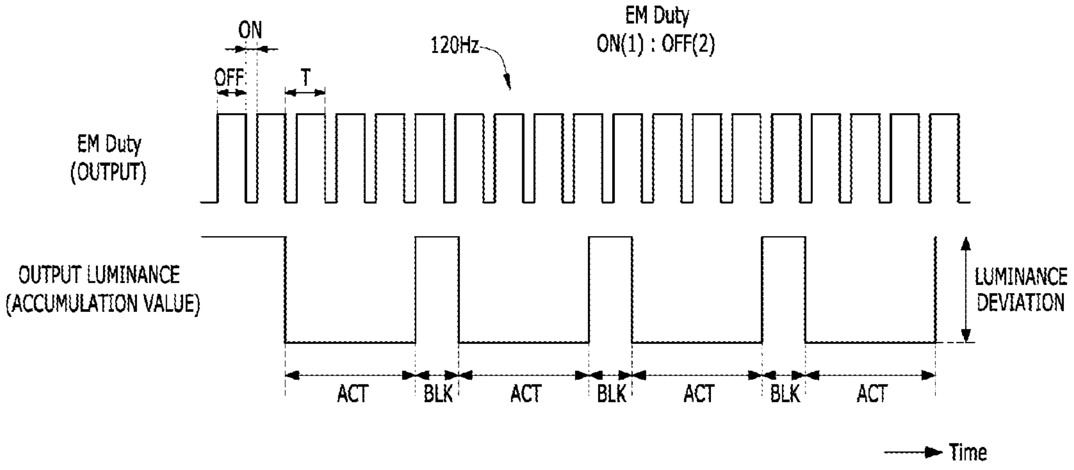
FIGS. 9 to 12 are diagrams showing a comparative example where an on duty ratio of a multi-toggled emission control signal is fixed to be constant regardless of an active period and a blank period.

FIG. 9 shows a case where a ratio of an on period of the emission control signal EM to an off period thereof is 1:2 with respect to a unit pulse period T, when a frame frequency is about 120 Hz. Also, FIG. 10 shows a case where a ratio of an on period of the emission control signal EM to an off period thereof is 1:2 with respect to the unit pulse period T, when the frame frequency is about 40 Hz.

Figure 10:
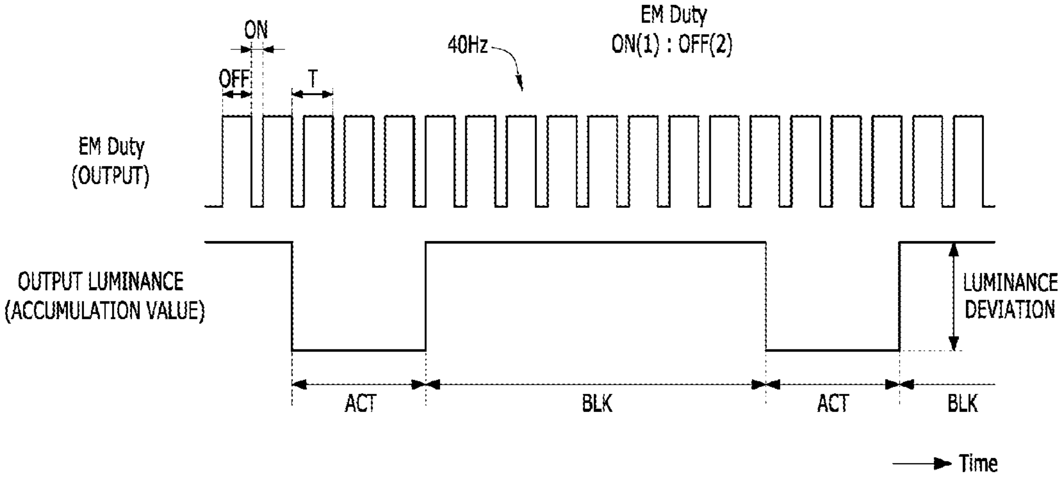
Figure 11:
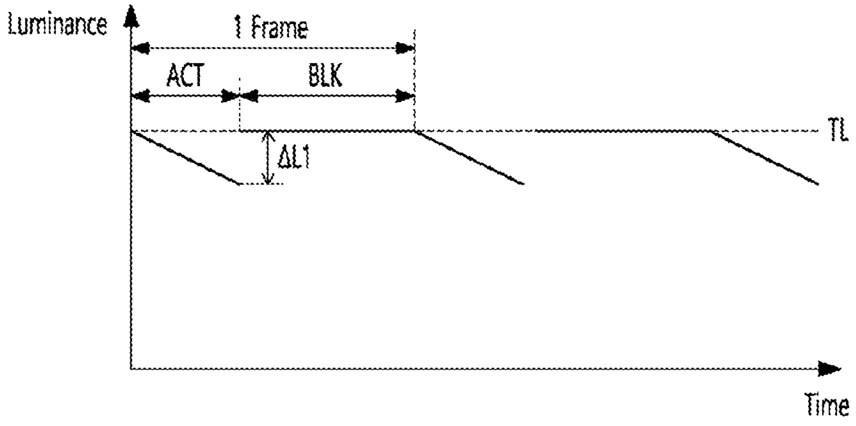
Figure 12:
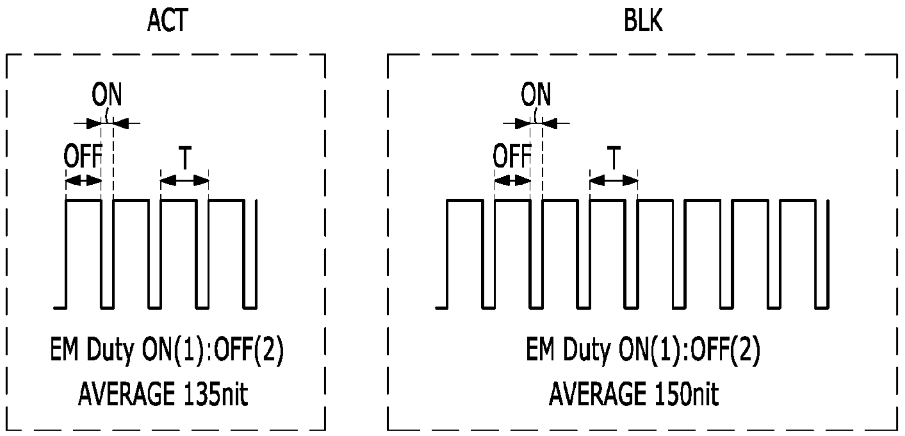

In FIGS. 9 and 10, an on duty ratio of the emission control signal EM may be intactly fixed to about 33% regardless of an active period ACT and a blank period BLK. When an on duty ratio of the emission control signal EM is fixed to the same value in the active period ACT and the blank period BLK, a deviation ΔL1 may occur between average luminance implemented in the active period ACT and average luminance implemented in the blank period BLK as in FIG. 11. That is, an average luminance of the blank period BLK may have a target level TL, and an average luminance of the active period ACT may be less than the target level TL.

For example, when a ratio of an on period of the emission control signal EM to an off period thereof is 1:2 with respect to the unit pulse period T, an average luminance of the blank period BLK may be about 150 nit which is the target level TL, and an average luminance of the active period ACT may be about 135 nit which is less than the target level TL.

This occurs because a driving current has a default value in the blank period BLK where a reference voltage Vref has a default level, and the driving current is less than the default value in the active period ACT where the reference voltage Vref is greater than the default level.

Frame luminance may be defined as a sum of average luminance implemented in the active period ACT and the blank period BLK. As a frame frequency is reduced (i.e., a ratio, occupied by the blank period BLK, of one frame increases), frame luminance may increase. On the other hand, as the frame frequency increases (i.e., a ratio, occupied by the blank period BLK, of one frame decreases), frame luminance may be reduced.

Frame luminance in a frame frequency of about 40 Hz may be greater than frame luminance in a frame frequency of about 120 Hz. Because a viewer recognizes an accumulation value of frame luminance as luminance in a corresponding frame frequency, when a first frame frequency is changed to a second frame frequency in the VRR mode, flicker caused by a luminance deviation may be recognized.

Figure 13:
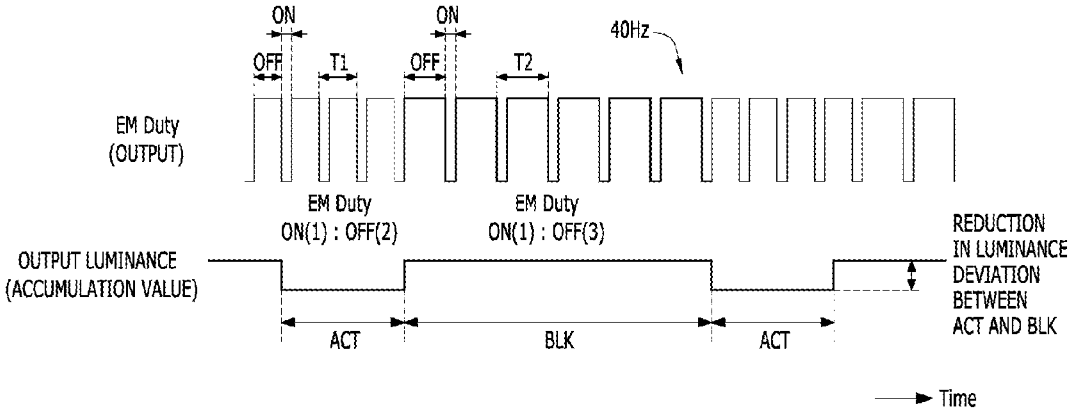
FIGS. 13 to 15 are diagrams showing a first embodiment where an on duty ratio of a multi-toggled emission control signal varies differently in an active period and a blank period.
Figure 14:
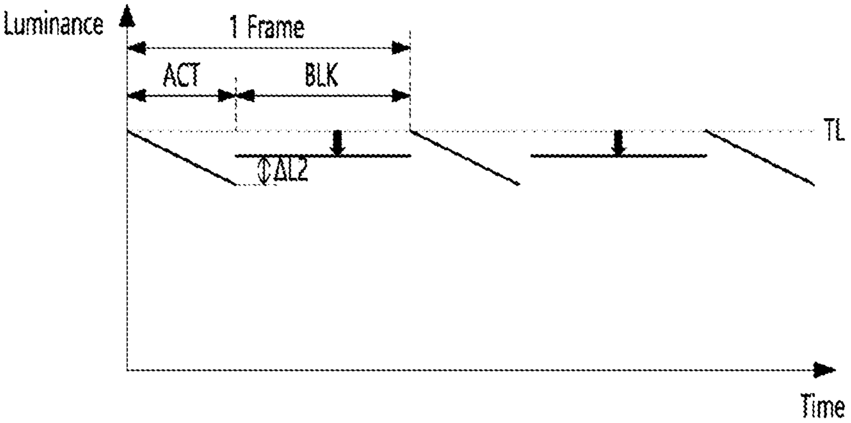
Figure 15:
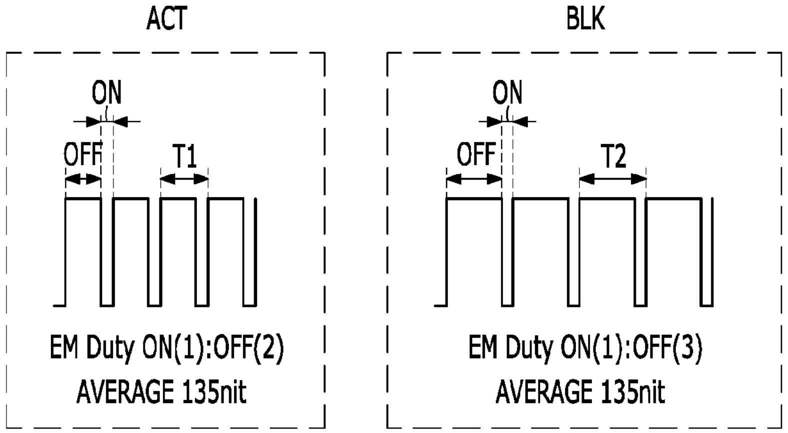

FIGS. 13 to 15 are diagrams showing a first embodiment where an on duty ratio of a multi-toggled emission control signal EM varies differently in an active period ACT and a blank period BLK.

Referring to FIGS. 13 to 15, a luminance deviation occurring in changing a frame frequency in a VRR mode may be caused by a luminance deviation between the active period ACT and the blank period BLK. To decrease the luminance deviation occurring in changing the frame frequency in the VRR mode, a timing controller according to the present embodiment may differently control an on duty ratio of an emission control signal EM in the active period ACT and the blank period BLK. The timing controller may perform control so that an on duty ratio of the emission control signal EM output by the gate driver 120 in the blank period BLK is less than the on duty ratio of the emission control signal EM output by the gate driver 120 in the active period ACT, and thus, may decrease a luminance deviation ΔL2 between the active period ACT and the blank period BLK. On the other hand, the timing controller may perform control so that an off duty ratio of the emission control signal EM output by the gate driver 120 is greater in the blank period BLK than the off duty ratio of the emission control signal EM output by the gate driver 120 in the active period ACT, and thus, may decrease the luminance deviation ΔL2 between the active period ACT and the blank period BLK.

To this end, the timing controller may set a unit pulse period which is longer in the blank period BLK than the active period ACT. For example, as in FIG. 13, when the frame frequency is about 40 Hz, the timing controller may set a first unit pulse period of the active period ACT to "T1" and may set a second unit pulse period of the blank period BLK to "T2" (T2≥T1) as shown in FIG. 15.

The first unit pulse period T1 may include a first on period and a first off period, and the second unit pulse period T2 may include a second on period and a second off period. Here, a length of the first on period may be the same as that of the second on period, and the second off period may be longer than the first off period.

As a result, when the frame frequency is about 40 Hz, a ratio of an on period of the emission control signal EM to an off period thereof in the first unit pulse period T1 of the active period ACT may be 1:2, and a ratio of an on period of the emission control signal EM to an off period thereof in the second unit pulse period T2 of the blank period BLK may be 1:3. An on duty of the emission control signal EM in the active period ACT may be about 33.33%, and an off duty of the emission control signal EM in the active period ACT may be about 66.67%. An on duty of the emission control signal EM in the blank period BLK may be about 25%, and an off duty of the emission control signal EM in the blank period BLK may be about 75%. In this case, an average luminance of the blank period BLK and an average luminance of the active period ACT may be about 135 nit and may be similar or equal to each other.

The timing controller may equally set the first unit pulse period T1 of the active period ACT in all frame frequencies which are variable and may equally set a ratio (for example, 1:2) of an off period of the emission control signal EM to an on period thereof based on the first unit pulse period T1 in all frame frequencies. Thus, the timing controller may set the first unit pulse period T1 for a first frame frequency to be the same as the first unit pulse period T1 for a second frame frequency that is different from the first frame frequency.

The timing controller may equally set the second unit pulse period T2 of the blank period BLK to be greater than the first unit pulse period T1 in all frame frequencies and may equally set a ratio (for example, 1:3) of an off period of the emission control signal EM to an on period thereof based on the second unit pulse period T2 in all frame frequencies. Thus, the timing controller may set the second unit pulse period T2 for a first frame frequency to be the same as the second unit pulse period T2 for the second frame frequency that is different from the first frame frequency.

Therefore, a gate driver may generate the emission control signal EM where an on duty ratio (or an off duty ratio) of the emission control signal EM during the active period ACT differs from an on duty ratio (or an off duty ratio) of the emission control signal EM during the blank period BLK and may apply the emission control signal EM to pixels.

According to the first embodiment, in changing the frame frequency in the VRR mode, a luminance deviation may be reduced, and flicker may decrease.

Figures 16, 17:
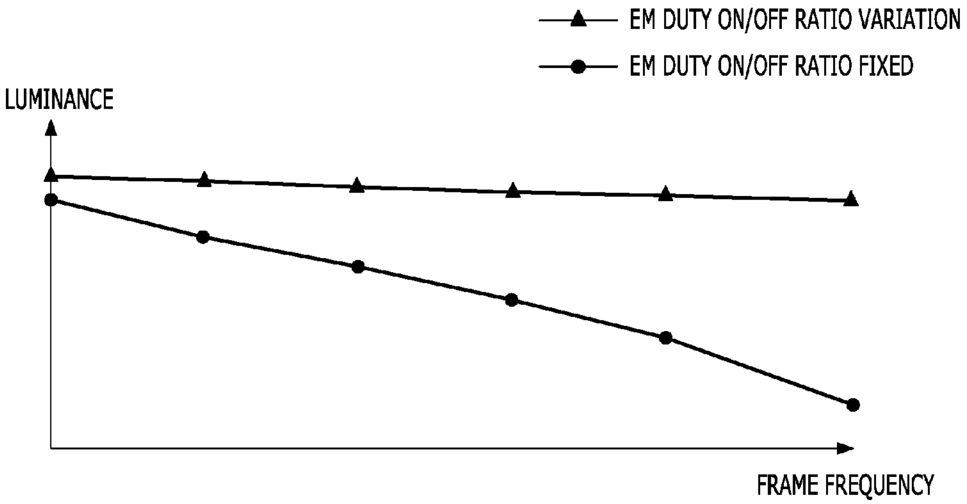
FIGS. 16 and 17 are diagrams showing luminance in each frame frequency in a comparative example having a fixed on duty ratio and luminance in each frame frequency in a first embodiment having a variable on duty ratio.

FIGS. 16 and 17 are diagrams showing luminance in each frame frequency in a comparative example having a fixed on duty ratio and luminance in each frame frequency in a first embodiment having a variable on duty ratio.

Referring to FIGS. 16 and 17, luminance in each frame frequency in a comparative example having a fixed on duty ratio may be 217 nit in 40 Hz, 215.7 nit in 60 Hz, 214.6 nit in 80 Hz, 213.4 nit in 100 Hz, 212 nit in 120 Hz, and 209.6 nit in 144 Hz. A maximum luminance deviation between frame frequencies may be about 4.7% and may be large.

On the other hand, luminance in each frame frequency of the first embodiment having a variable on duty ratio may be 217.9 nit in 40 Hz, 217.7 nit in 60 Hz, 217.5 nit in 80 Hz, 217.3 nit in 100 Hz, 217.2 nit in 120 Hz, and 217 nit in 144 Hz. A maximum luminance deviation between frame frequencies may be about 0.05% and may be less than the comparative example.

In the first embodiment having a variable on duty ratio, because a luminance deviation between frame frequencies is small, flicker recognizable in changing the frame frequency may be considerably reduced.

Figure 18:
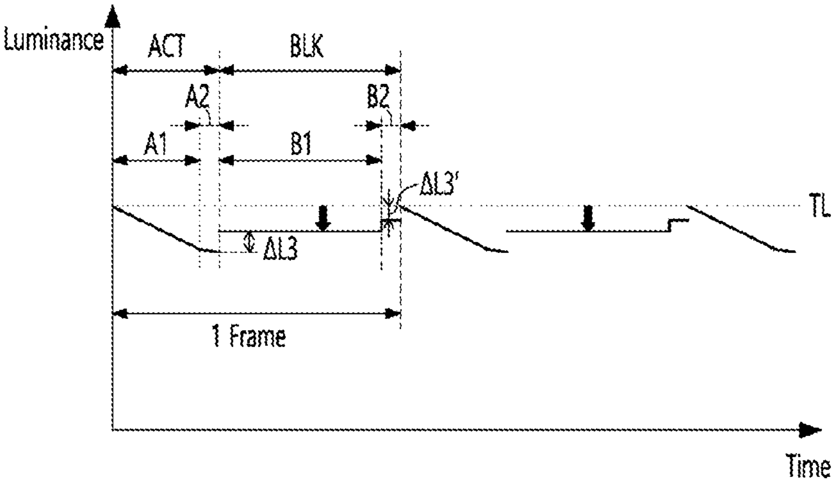
FIGS. 18 and 19 are diagrams showing a second embodiment where an on duty ratio of a multi-toggled emission control signal varies differently in an active period and a blank period.
Figure 19:
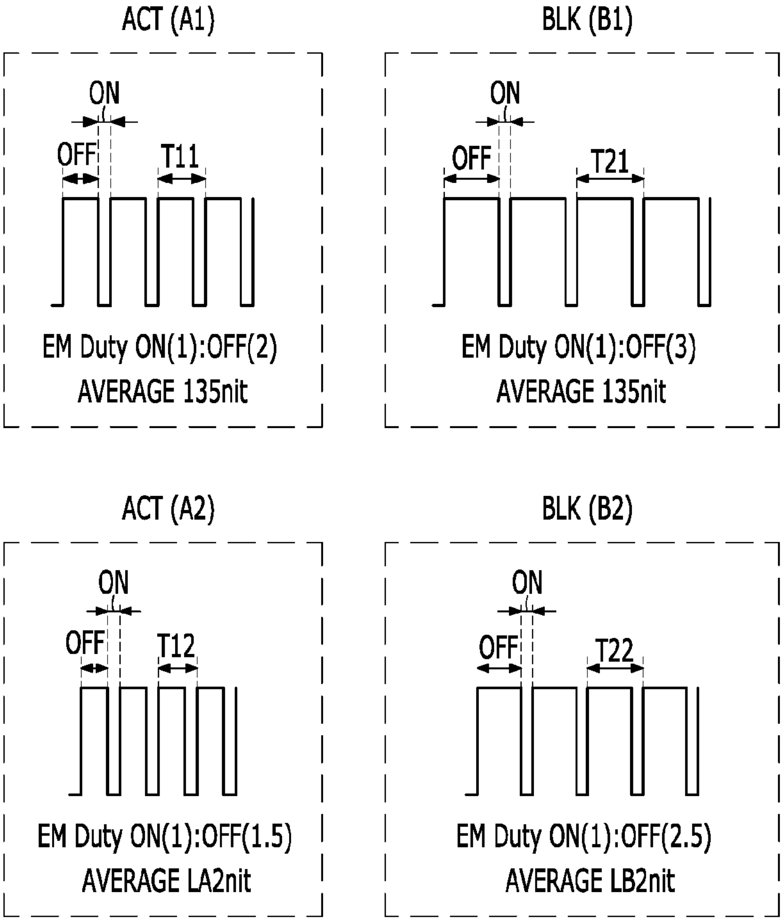

FIGS. 18 and 19 are diagrams showing a second embodiment where an on duty ratio of a multi-toggled emission control signal varies differently in an active period and a blank period.

Referring to FIGS. 18 and 19, the second embodiment of the present disclosure may reduce a rapid luminance variation at a time at which an active period ACT of a first frame is changed to a blank period BLK of the first frame and a rapid luminance variation at a time at which the blank period BLK of the first frame is changed to the active period ACT of the first frame, and thus, may further decrease flicker which are recognizable in changing a frame frequency.

According to the second embodiment, the active period ACT may be divided into a first active period A1 and a second active period A2 succeeding (e.g., immediately after) the first active period A1. Also, the blank period BLK may be divided into a first blank period B1 succeeding the second active period A2 and a second blank period B2 succeeding the first blank period B1.

A timing controller may control an on duty ratio of an emission control signal EM to a first value in the first blank period B1, to a second value in the second blank period B2, to a third value in the first active period A1, and to a fourth value in the second active period A2. In this case, the first to fourth values may satisfy "first value<second value<third value<fourth value".

To this end, the timing controller may set a first unit pulse period of the first active period A1 to "T11", set a second unit pulse period of the second active period A2 to "T12", set a third unit pulse period of the first blank period B1 to "T21", and set a fourth unit pulse period of the second blank period B2 to "T22". T11 to T22 may satisfy "T12<T11<T22<T21"

The first unit pulse period T11 may include a first on period and a first off period, and the second unit pulse period T12 may include a second on period and a second off period. The third unit pulse period T21 may include a third on period and a third off period, and the fourth unit pulse period T22 may include a fourth on period and a fourth off period. Here, lengths of the first to fourth on periods may be equal to one another, and lengths of the first to fourth off periods may differ. A length of the second off period may be shorter than that of the first off period, and a length of the fourth off period may be shorter than that of the third off period. Also, a length of the fourth off period may be longer than that of the first off period.

A ratio of an on period of the emission control signal EM to an off period thereof in the first unit pulse period T11 of the first active period A1 may be 1:2, and a ratio of an on period of the emission control signal EM to an off period thereof in the second unit pulse period T12 of the second active period A2 may be 1:1.5. Also, a ratio of an on period of the emission control signal EM to an off period thereof in the third unit pulse period T21 of the first blank period B1 may be 1:3, and a ratio of an on period of the emission control signal EM to an off period thereof in the fourth unit pulse period T22 of the second blank period B2 may be 1:2.5.

An on duty of the emission control signal EM in the first active period A1 may be about 33.33%, and an off duty of the emission control signal EM in the first active period A1 may be about 66.67%. An on duty of the emission control signal EM in the second active period A2 may be about 40%, and an off duty of the emission control signal EM in the second active period A2 may be about 60%. An on duty of the emission control signal EM in the first blank period B1 may be about 25%, and an off duty of the emission control signal EM in the first blank period B1 may be about 75%. An on duty of the emission control signal EM in the second blank period B2 may be about 28.57%, and an off duty of the emission control signal EM in the second blank period B2 may be about 71.43%.

In this case, an average luminance of the first blank period B1 and an average luminance of the first active period A1 may be about 135 nit and may be equal to each other. A luminance deviation ΔL3 at a time at which the first active period A1 is changed to the first blank period B1 may be reduced by an average luminance LA2 of the second active period A2. A luminance deviation ΔL3' at a time at which the first blank period B1 is changed to the first active period A1 of a subsequent frame may be reduced by an average luminance LA2 of the second blank period B2.

Furthermore, according to the second embodiment, in changing the frame frequency in the VRR mode, a luminance deviation may be reduced, and flicker may decrease.

Figure 20:
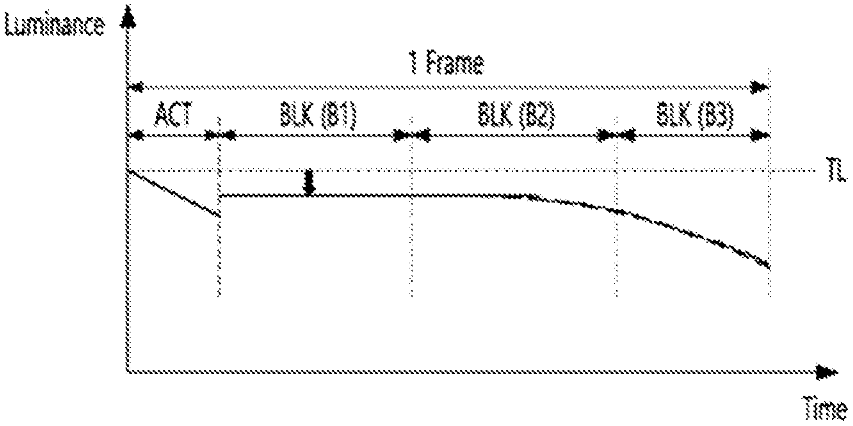
FIGS. 20 and 21 are diagrams showing a third embodiment where an on duty ratio of a multi-toggled emission control signal varies differently in an active period and a blank period.
Figure 21:
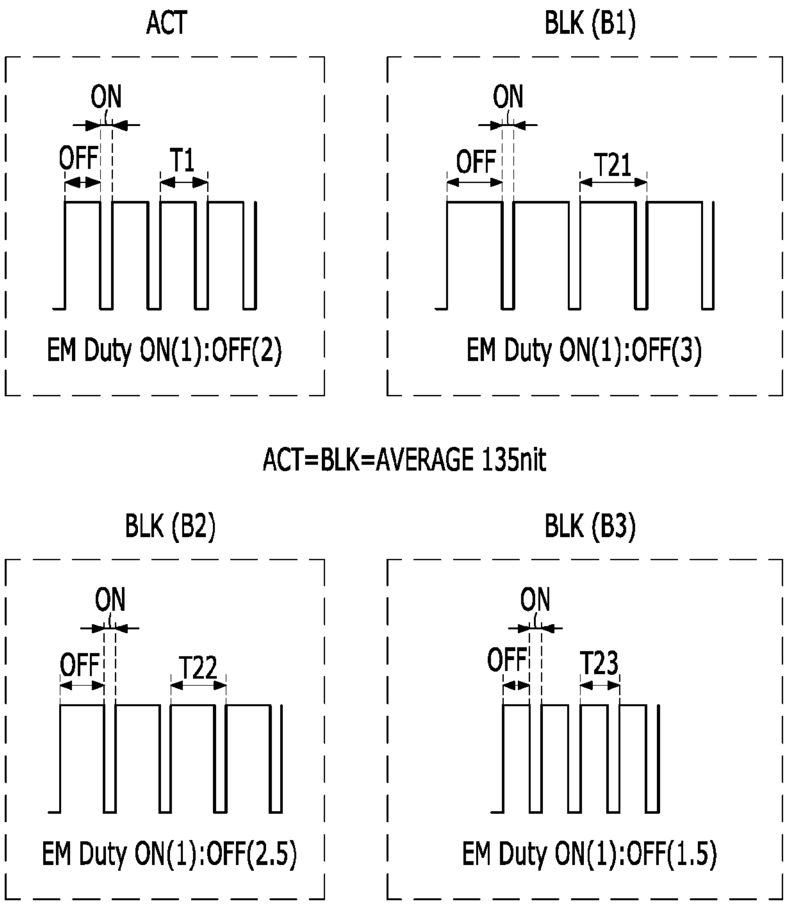

FIGS. 20 and 21 are diagrams showing a third embodiment where an on duty ratio of a multi-toggled emission control signal varies differently in an active period and a blank period.

Referring to FIGS. 19 and 20, like the first embodiment described above, in the third embodiment of the present disclosure, an average luminance of a blank period BLK and an average luminance of an active period ACT may be adjusted to be equal to each other. In the third embodiment, in order to enable average luminance to be more easily adjusted in the blank period BLK, the blank period BLK may be subdivided into a plurality of blanks periods B1 to B3 which are continuous without another active period between the plurality of blank periods B1 to B3, an on duty ratio of an emission control signal EM in some blank periods B1 and B2 of the plurality of blank periods B1 to B3 may be controlled to be less than the active period ACT, and an on duty ratio of the emission control signal EM in the other blank period B3 of the plurality of blank periods B1 to B3 may be controlled to be greater than the active period ACT.

According to the third embodiment, the blank period BLK may be divided into a first blank period B1, a second blank period B2 succeeding the first blank period B1, and a third blank period B3 succeeding the second blank period BLK2.

A timing controller may control an on duty ratio of the emission control signal EM to a first value in the first blank period B1, to a second value in the second blank period B2, to a third value in the active period ACT, and to a fourth value in the third blank period B3. In this case, the first to fourth values may satisfy "first value<second value<third value<fourth value".

To this end, the timing controller may set a first unit pulse period of the active period ACT to "T1", set a second unit pulse period of the first blank period B1 to "T21", set a third unit pulse period of the second blank period B2 to "T22", and set a fourth unit pulse period of the third blank period B3 to "T23". T1 and T21 to T23 may satisfy "T23<T1<T22<T21".

The first unit pulse period T1 may include a first on period and a first off period, and the second unit pulse period T21 may include a second on period and a second off period. The third unit pulse period T22 may include a third on period and a third off period, and the fourth unit pulse period T23 may include a fourth on period and a fourth off period. Here, lengths of the first to fourth on periods may be equal to one another, and lengths of the first to fourth off periods may differ. A length of each of the second and third off periods may be longer than that of the first off period, and a length of the fourth off period may be less than that of the first off period.

A ratio of an on period of the emission control signal EM to an off period thereof in the first unit pulse period T1 of the active period ACT may be 1:2. A ratio of an on period of the emission control signal EM to an off period thereof in the second unit pulse period T21 of the first blank period B1 may be 1:3, a ratio of an on period of the emission control signal EM to an off period thereof in the third unit pulse period T22 of the second blank period B2 may be 1:2.5, and a ratio of an on period of the emission control signal EM to an off period thereof in the fourth unit pulse period T23 of the third blank period B3 may be 1:1.5.

An on duty of the emission control signal EM in the active period ACT may be about 33.33%, and an off duty of the emission control signal EM in the active period ACT may be about 66.67%. An on duty of the emission control signal EM in the first blank period B1 may be about 25%, and an off duty of the emission control signal EM may be about 75%. An on duty of the emission control signal EM in the second blank period B2 may be about 28.57%, and an off duty of the emission control signal EM may be about 71.43%. An on duty of the emission control signal EM in the third blank period B3 may be about 40%, and an off duty of the emission control signal EM may be about 60%.

In this case, an average luminance of the blank period BLK and an average luminance of the active period ACT may be about 135 nit and may be equal to each other.

According to the third embodiment, in changing the frame frequency in the VRR mode, a luminance deviation may be reduced, and flicker may decrease.

Figure 22:
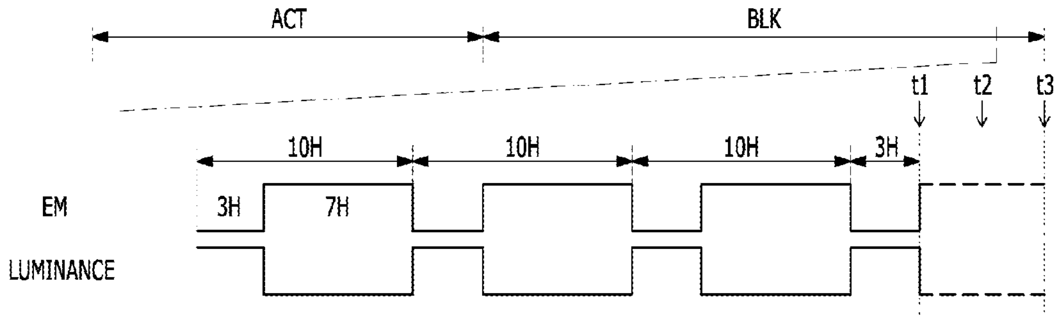
FIGS. 22 and 23 are diagrams for describing an example where an on duty ratio of an emission control signal varying based on a frame frequency is reset at every one frame.
Figure 23:
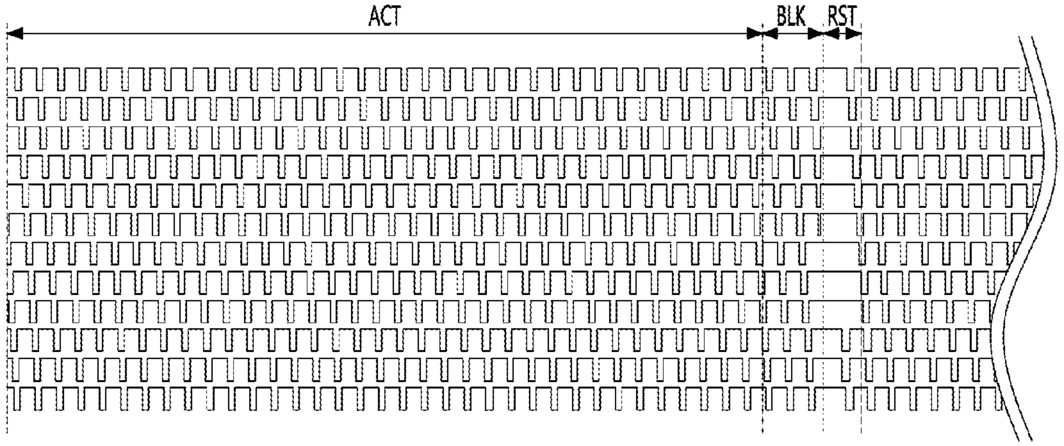

FIGS. 22 and 23 are diagrams for describing an example where an on duty ratio of an emission control signal varying based on a frame frequency is reset every one frame according to one embodiment.

Referring to FIGS. 22 and 23, an on duty in a blank period BLK of an emission control signal EM may vary according to a length of a blank period BLK based on a variation of a frame frequency. For example, when a unit pulse period of the blank period BLK is set to 10 horizontal period 10H, an on duty in the blank period BLK may vary based on end times t1 to t3 of the blank period BLK.

Therefore, an initialization operation on the emission control signal EM may be needed for synchronization with a scan signal at a start timing of each frame.

To this end, a timing controller may further allocate a reset period RST in one frame and may initialize all emission control signals EM, applied to a display panel, to an off level in the reset period RST. The reset period RST may be arranged after the blank period BLK in one frame.

The present embodiment may realize the following effects.

The present embodiment may differently control an on duty ratio of an emission control signal in an active period and a blank period. That is, in the present embodiment, a luminance deviation between the active period and the blank period may decrease by performing control so that an on duty ratio of the emission control signal is less in the blank period than the active period.

Accordingly, in the present embodiment, a luminance deviation occurring in changing a frame frequency and flickers caused thereby may decrease in the VRR mode.

The effects according to the present disclosure are not limited to the above examples, and other various effects may be included in the specification.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. A display apparatus comprising:

a display panel including a plurality of pixels that emit light, wherein an amount of emitted light is controlled based on a data voltage, and an emission time of the plurality of pixels is controlled based on a duty ratio of an emission control signal applied to the plurality of pixels;

a timing controller configured to control the emission control signal in an active period of one frame and in a blank period of the one frame, where the data voltage is supplied to the plurality of pixels during the active period of the one frame and the data voltage is maintained during the blank period of the one frame; and a gate driver configured to apply to the plurality of pixels the emission control signal having a first duty ratio during the active period and the emission control signal having a second duty ratio that is different from the first duty ratio during the blank period, wherein a unit pulse period of the emission control signal includes a first period during which the emission control signal has an on level and a second period during which the emission control signal has an off level, wherein the gate driver outputs the emission control signal such that the unit pulse period of the emission control signal during the blank period is longer than the unit pulse period during the active period, wherein a first unit pulse period of the emission control signal during the active period comprises a first on period and a first off period, and a second unit pulse period of the emission control signal during the blank period comprises a second on period and a second off period, and wherein a length of the first on period during the active period is equal to a length of the second on period during the blank period, and a length of the second off period during the blank period is longer than a length of the first off period during the active period.

2. The display apparatus of claim 1, wherein the first duty ratio is an on level period of the emission control signal having an on level during the active period, and the second duty ratio is an on level period of the emission control signal having the on level during the blank period, and the gate driver outputs the emission control signal such that the second duty ratio of the emission control signal during the blank period is less than the first duty ratio during the active period.

3. The display apparatus of claim 1, wherein the first duty ratio is an off level period of the emission control signal having an off level during the active period, and the second duty ratio is an off level period of the emission control signal having the off level during the blank period, and the timing controller performs control such that that the second duty ratio of the emission control signal during the blank period is greater than the first duty ratio during the active period.

4. The display apparatus of claim 1, wherein, in each of the active period and the blank period, the emission control signal toggles between an on level and an off level a plurality of times.

5. The display apparatus of claim 1, wherein the timing controller varies a length of the blank period based on a frame frequency and maintains a length of the active period to be fixed regardless of the frame frequency.

6. A display apparatus comprising:

a display panel including a plurality of pixels that emit light, wherein an amount of emitted light is controlled based on a data voltage, and an emission time of the plurality of pixels is controlled based on a duty ratio of an emission control signal applied to the plurality of pixels;

a timing controller configured to control the emission control signal in an active period of one frame and in a blank period of the one frame, where the data voltage is supplied to the plurality of pixels during the active period of the one frame and the data voltage is maintained during the blank period of the one frame; and a gate driver configured to apply to the plurality of pixels the emission control signal having a first duty ratio during the active period and the emission control signal having a second duty ratio that is different from the first duty ratio during the blank period, wherein a unit pulse period of the emission control signal includes a first period during which the emission control signal has an on level and a second period during which the emission control signal has an off level, wherein the active period comprises a first active period and a second active period after the first active period, and the blank period comprises a first blank period after the second active period and a second blank period after the first blank period, and wherein the gate driver outputs the emission control signal to have the first duty ratio during the first active period, to have a third duty ratio during the second active period that is greater than the first duty ratio, to have the second duty ratio during the first blank period that is less than the first duty ratio and the third duty ratio, and to have a fourth duty ratio during the second blank period that is greater than the second duty ratio but less than the first duty ratio and the third duty ratio.

7. The display apparatus of claim 1, wherein the blank period comprises a plurality of blank periods that are continuous without another active period between the plurality of blank periods, the gate driver outputs the emission control signal such that a duty ratio of the emission control signal during at least one of the plurality of blank periods is less than the first duty ratio of the emission control signal during the active period, and the gate driver outputs the emission control signal such that a duty ratio of the emission control signal during at least one of the plurality of blank periods is greater than the first duty ratio of the emission control signal during the active period.

8. The display apparatus of claim 7, wherein the plurality of blank periods include a first blank period, a second blank period after the first blank period, and a third blank period after the second blank period, and the gate driver outputs the emission control signal to have the second duty ratio during the first blank period, to have a third duty ratio that is greater than the second duty ratio during the second blank period, and to have a fourth duty ratio that is greater than the second duty ratio and the third duty ratio during the third blank period.

9. The display apparatus of claim 1, wherein the one frame further comprises a reset period after the blank period during which the timing controller initializes all emission control signals applied to the display panel to an off level.

10. The display apparatus of claim 1, wherein each of the plurality of pixels comprises a micro light emitting diode (LED) chip.

11. A method of driving a display apparatus including a plurality of pixels that emit light where an amount of emitted light is controlled based on a data voltage, and an emission time of the plurality of pixels is controlled based on a duty ratio of an emission control signal applied to the plurality of pixels, the method comprising:

controlling the duty ratio of the emission control signal in an active period of one frame and in a blank period of the one frame, where the data voltage is supplied to the plurality of pixels during the active period of the one frame and the data voltage is maintained during the blank period of the one frame; and applying to the plurality of pixels the emission control signal having a first duty ratio during the active period and the emission control signal having a second duty ratio that is different from the first duty ratio during the blank period, wherein a unit pulse period of the emission control signal includes a first period during which the emission control signal has an on level and a second period during which the emission control signal has an off level, wherein the unit pulse period of the emission control signal during the blank period is longer than the unit pulse period of the emission control signal during the active period, wherein a first unit pulse period of the emission control signal during the active period comprises a first on period and a first off period, and a second unit pulse period of the emission control signal during the blank period comprises a second on period and a second off period, and wherein a length of the first on period during the active period is equal to a length of the second on period during the blank period, and a length of the second off period during the blank period is longer than a length of the first off period during the active period.

12. The method of claim 11, wherein the first duty ratio is an on level period of the emission control signal having an on level during the active period, and the second duty ratio is an on level period of the emission control signal having the on level during the blank period, and the method further comprising:

outputting the emission control signal such that the second duty ratio of the emission control signal during the blank period is less than the first duty ratio during the active period.

13. A display device comprising:

a display panel including a plurality of pixels that emit light, wherein an amount of emitted light is based on a data voltage, and an emission time of the plurality of pixels is controlled by a duty ratio of an emission control signal applied to the plurality of pixels;

a timing controller configured to switch driving of the plurality of pixels between a first frame frequency and a second frame frequency that is different from the first frame frequency; and a gate driver configured to apply to the plurality of pixels the emission control signal having a first duty ratio during an active period of one frame during which data voltages are supplied to the plurality of pixels, and apply the emission control signal having a second duty ratio that is different from the first duty ratio during a blank period of the one frame during which the data voltages are maintained, wherein the emission control signal has the first duty ratio during an active period of a first frame having the first frame frequency and during an active period of a second frame having the second frame frequency, and the emission control signal has the second duty ratio during a blank period of the first frame having the first frame frequency and during a blank period of the second frame having the second frame frequency, wherein a unit pulse period of the emission control signal includes a first period during which the emission control signal has an on level and a second period during which the emission control signal has an off level, and wherein the unit pulse period of the emission control signal during the blank period is longer than the unit pulse period of the emission control signal during the active period, wherein a first unit pulse period of the emission control signal during the active period comprises a first on period and a first off period, a second unit pulse period of the emission control signal during the blank period comprises a second on period and a second off period, and wherein a length of the first on period during the active period is equal to a length of the second on period during the blank period, and a length of the second off period during the blank period is longer than a length of the first off period during the active period.

14. The display device of claim 13, wherein the first duty ratio and the second duty ratio are on duty ratios of a period of time while the plurality of pixels emit light and a period of time that the plurality of pixels do not emit light, and the second duty ratio of the emission control signal during the blank period is less than the first duty ratio during the active period.

15. The display device of claim 13, wherein, in each of the active period and the blank period, the emission control signal switches between an on level and an off level a plurality of times.

16. The display device of claim 13, wherein a length of the active period during the first frame frequency is a same as a length of the active period during the second frame frequency, and a length of the blank period during the first frame frequency is different from a length of the blank period during the second frame frequency.

17. The display device of claim 13, wherein the blank period comprises a plurality of blank periods that are continuous without another active period between the plurality of blank periods, wherein gate driver applies the emission control signal such that a duty ratio of the emission control signal during at least one of the plurality of blank periods is less than the first duty ratio of the emission control signal during the active period, and applies the emission control signal such that a duty ratio of the emission control signal during at least one of the plurality of blank periods is greater than the first duty ratio of the emission control signal during the active period.

18. The display device of claim 17, wherein the plurality of blank periods include a first blank period, a second blank period after the first blank period, and a third blank period after the second blank period, and the gate driver applies the emission control signal having second duty ratio during the first blank period, applies the emission control signal having a third duty ratio that is greater than the second duty ratio during the second blank period, and applies the emission control signal having a fourth duty ratio that is greater than the second duty ratio and the third duty ratio during the third blank period.

* * * * *